United States Patent
Terhune et al.

(10) Patent No.: US 12,044,327 B2
(45) Date of Patent: *Jul. 23, 2024

(54) MULTI-FUNCTION SUBPLATE MOUNTED VALVE

(71) Applicant: The Oilgear Company, Traverse City, MI (US)

(72) Inventors: Mitch Terhune, Traverse City, MI (US); Jared Schlueter, Interlochen, MI (US)

(73) Assignee: The Oilgear Company, Traverse City, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/827,091

(22) Filed: May 27, 2022

(65) Prior Publication Data

US 2022/0290768 A1   Sep. 15, 2022

Related U.S. Application Data

(63) Continuation of application No. 17/093,237, filed on Nov. 9, 2020, now Pat. No. 11,480,255.
(Continued)

(51) Int. Cl.
  *F16K 3/26* (2006.01)
  *F16K 3/24* (2006.01)
  (Continued)

(52) U.S. Cl.
  CPC .............. *F16K 3/267* (2013.01); *F16K 3/246* (2013.01); *F16K 11/0716* (2013.01);
  (Continued)

(58) Field of Classification Search
  CPC ...... F16K 11/0716; F16K 3/246; F16K 3/267; F16K 31/1221; Y10T 137/8663
  (Continued)

(56) References Cited

U.S. PATENT DOCUMENTS 3,106,938 A * 10/1963 Gordon ................. F15B 9/10
  137/625.68
3,921,660 A   11/1975 Kowalski
  (Continued)

FOREIGN PATENT DOCUMENTS

WO   2013192494 A1   12/2013
WO   WO-2020091037 A1 *  5/2020 ............... F16K 1/36

*Primary Examiner* — William M McCalister
(74) *Attorney, Agent, or Firm* — GableGotwals; David G. Woodral

(57) ABSTRACT

A normally closed subplate mounted valve has a lower valve seat defining a function port, an upper seat, and a sleeve between the upper seat and the lower seat. The sleeve defines a first port. The poppet is movable within the sleeve to selectively seal against the lower seat in a piloted position or to seal against the upper seat in an offset position. The poppet blocks the first port when the poppet is positioned in an offset position. A piston shaft is affixed to the poppet for moving the poppet into the piloted or offset position. A spring biases the poppet in the offset position for preventing fluid flow into the first port. A pilot port supplies pressure for sliding the piston to compress the spring and to move the poppet away from the offset position to the piloted position so that fluid may flow into a supply port and out of the function port. A second port may be provided in the sleeve. The ports may be selectively configured for supply or vent. Components may be joined with retainer springs. The piston shaft and poppet connector may be a key and key slot engagement. The ports may be shaped for progressive exposure by movement of the poppet. The poppet may be designed to enable pressure assist through the first port when moving the poppet to the piloted position. The valve seats may be provided with angled sealing surfaces that are angularly offset from their mating counterparts.

16 Claims, 9 Drawing Sheets

OFFSET POSITION

Related U.S. Application Data

(60) Provisional application No. 62/933,124, filed on Nov. 8, 2019.

(51) Int. Cl.
*F16K 11/07* (2006.01)
*F16K 15/18* (2006.01)
*F16K 17/04* (2006.01)
*F16K 17/10* (2006.01)
*F16K 31/122* (2006.01)

(52) U.S. Cl.
CPC .......... *F16K 17/0486* (2013.01); *F16K 17/10* (2013.01); *F16K 15/1826* (2021.08); *F16K 31/1221* (2013.01); *Y10T 137/8663* (2015.04)

(58) Field of Classification Search
USPC ...................................... 137/625.66; 251/333
See application file for complete search history.

(56) References Cited

U.S. PATENT DOCUMENTS

| | | | | |
|---|---|---|---|---|
| 4,491,154 A * | 1/1985 | Peters | ................ | F16K 31/124 |
| | | | | 137/625.68 |
| RE31,845 E * | 3/1985 | Peters | ................ | F16K 11/0716 |
| | | | | 137/557 |
| 4,741,364 A * | 5/1988 | Stoss | ................ | F15B 13/0402 |
| | | | | 137/625.6 |
| 4,887,643 A * | 12/1989 | Tomlin | ................ | F16K 11/0716 |
| | | | | 137/625.68 |
| 5,005,803 A * | 4/1991 | Fritz | ................ | F16F 9/325 |
| | | | | 251/129.05 |
| 5,011,113 A * | 4/1991 | Stobbs | ................ | F16F 9/46 |
| | | | | 251/129.21 |
| 5,771,931 A * | 6/1998 | Watson | ................ | F16K 31/1221 |
| | | | | 137/236.1 |
| 5,873,561 A | 2/1999 | Bourkel et al. | | |
| 5,901,749 A * | 5/1999 | Watson | ................ | F16K 31/1221 |
| | | | | 251/900 |
| 10,337,638 B2 * | 7/2019 | Landrith | ................ | F16K 31/1221 |
| 11,480,255 B2 * | 10/2022 | Terhune | ................ | F16K 3/246 |
| 11,655,898 B2 * | 5/2023 | Hosokawa | ................ | F16K 1/36 |
| | | | | 251/333 |
| 2009/0050222 A1 | 2/2009 | Jackson et al. | | |
| 2014/0014864 A1* | 1/2014 | Najmolhoda | ................ | F16K 39/04 |
| | | | | 251/129.15 |
| 2016/0153578 A1* | 6/2016 | Landrith, II | ................ | F16K 31/0696 |
| | | | | 137/625.48 |
| 2016/0167458 A1 | 6/2016 | Laanemets et al. | | |
| 2017/0097100 A1 | 4/2017 | Patterson | | |
| 2021/0140551 A1* | 5/2021 | Terhune | ................ | F16K 3/26 |
| 2021/0310583 A1* | 10/2021 | McMiles | ................ | F16K 11/0716 |
| 2021/0332895 A1* | 10/2021 | Du | ................ | F16K 31/007 |
| 2022/0290768 A1* | 9/2022 | Terhune | ................ | F16K 15/1826 |

* cited by examiner

OFFSET POSITION

PILOTED POSITION

MULTI-FUNCTION SUBPLATE MOUNTED VALVE

CROSS REFERENCE TO RELATED APPLICATIONS

This application is a continuation of U.S. patent application Ser. No. 17/093,237 entitled MULTI-FUNCTION SUBPLATE MOUNTED VALVE filed on Nov. 9, 2020 which claims the benefit of U.S. Provisional Patent Application No. 62/933,124 titled "NORMALLY CLOSED SUBPLATE MOUNTED VALVE," filed Nov. 8, 2019, the contents of which are hereby incorporated by reference.

FIELD OF THE INVENTION

This disclosure relates to hydraulic valves in general and, more specifically, to subplate mounted valves.

BACKGROUND OF THE INVENTION

A valve is often used to control a flow of fluid. Valves may be mounted on a sub-plate that connects the valve to various piping. Sub-plate mounted valves are commonly used in blowout preventer (BOP) and remotely operated vehicle (ROV) applications. Sub-plate mounted valves may experience several shortcomings in applications where extreme reliability, near-zero leakage, or high flow efficiency are required. For example, sub-plate mounted valves may be susceptible to flow force, may be susceptible to increased wear, may have a short service life, and may experience water-hammer. Accordingly, reducing these shortcomings is of paramount importance in the design of new valves.

SUMMARY OF THE INVENTION

The valve of the invention includes a lower valve seat defining a function port, an upper valve seat, and a sleeve between the upper valve seat and the lower valve seat. The sleeve defines a poppet chamber. The sleeve defines a first port. A poppet is received in the poppet chamber. The poppet is movable within the sleeve to selectively seal against the lower valve seat in a piloted position or to seal against the upper valve seat in an offset position. A sidewall of the poppet blocks the first port when the poppet is positioned in the offset position. The valve includes a piston having a piston shaft. The piston shaft is affixed to the poppet for selectively moving the poppet into the piloted position and the offset position. A spring biases the piston so that the poppet defaults in the offset position against the upper valve seat for preventing fluid flow into the first port. A pilot port supplies pressure for sliding the piston to compress the spring and to move the poppet away from the offset position to the piloted position so that fluid may flow into the first supply and out of the function port.

In one embodiment, the first port is a supply port. In another embodiment, the first port is a vent port. In one embodiment, the sleeve further defines second port proximate the lower valve seat and provides a fluid path from outside the valve to the function port when the poppet is in the offset position in contact with the upper valve seat. In one embodiment, the second port is a vent port. In another embodiment, the second port is a supply port. In one embodiment, the poppet blocks fluid flow to the second port when the poppet is in the piloted position in contact with the lower valve seat.

In one embodiment, a second end of the lower valve seat has a second end with a stepped surface. The stepped surface defines a first portion of an external groove. The sleeve has a stepped first surface that is complementary to the stepped surface of the lower valve seat. The stepped surface of the sleeve defines a second portion of the second external groove. A retainer spring is located in the external groove for securing the lower seat and the sleeve together.

In one embodiment, the sleeve has a stepped surface on a second end. The stepped surface defines a first portion of an external groove. The upper seat has a stepped surface on a first end that is complementary to the stepped surface on the second end of the sleeve. The stepped surface on the upper seat defines a second portion of an external groove. A retainer spring received in the first portion and the second portion of an external groove for securing the sleeve and the upper seat together. The retainer springs allow for components of the valve to be separated from one another without threadably removing the valve from a manifold.

The poppet defines a piston shaft connector for securing the poppet to the piston shaft. In one embodiment, the piston shaft connector defines a key slot. In one embodiment, the piston shaft defines a key having a complementary shape to the key slot.

In one embodiment, the first port and second port are shaped such that when the poppet is moved from the offset position to the piloted position, a sealing portion of the sidewall of the poppet first exposes a small portion of the port along a shaped side and progressively more of the port is exposed as more of the port is passed by the sealing portion of the sidewall of the poppet.

In one embodiment, the poppet has a first side and second side, wherein the poppet has structure facing the first side and has structure facing the second side. The structure facing the first side has a greater surface area than the structure facing the second side, for enabling pressure assist through the first port when moving the poppet from the offset position to the piloted position.

In one embodiment, the upper and lower valve seats define a sealing surface that defines an angled or sloped contact surface. The engaging ends of the poppet defines a beveled surface for sealing contact with the angled or sloped contact surface. The angled or sloped contact surface forms a first angle with respect to a longitudinal axis of the valve. The beveled end surfaces form a second angle with respect to the longitudinal axis of the valve. In one embodiment, the first angle and the second angle are different. In one embodiment, the first angle and the second angle differ an amount between 0.5 to 5 degrees.

DETAILED DESCRIPTION OF THE PREFERRED EMBODIMENTS

According to aspects of a present disclosure a valve 10 is disclosed. Valve 10 may be operable in subsea conditions and operate as part of a fluid or hydraulic circuit. In some embodiments, valve 10 is a subplate mounted (SPM) valve. As described in various embodiments, valve 10 may be of the normally closed type. Valve 10 may be described as a two position, three way, pilot operated.

Figure 1:
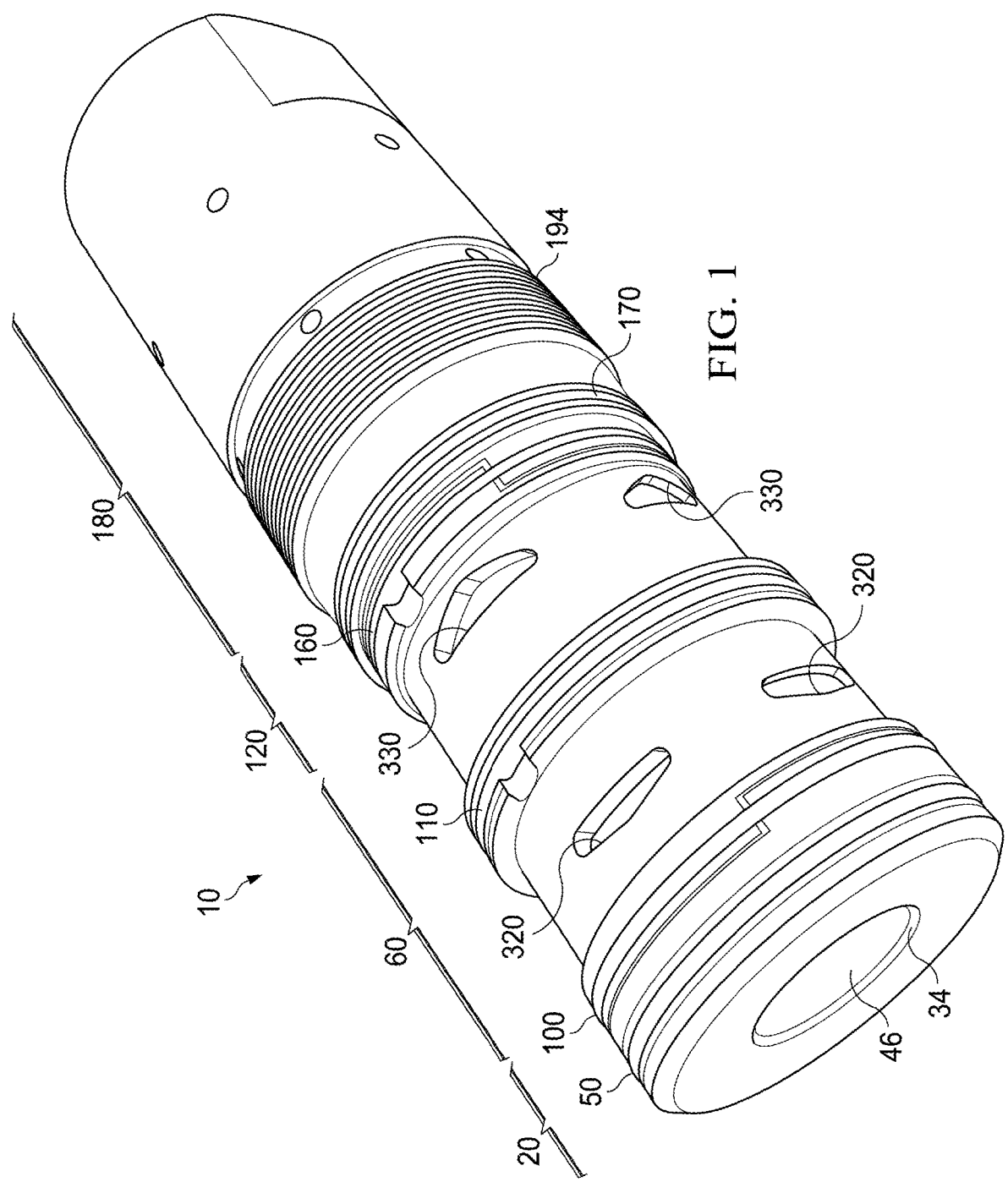
FIG. 1 is a bottom perspective view of a valve according to aspects of the present disclosure.
Figure 2:
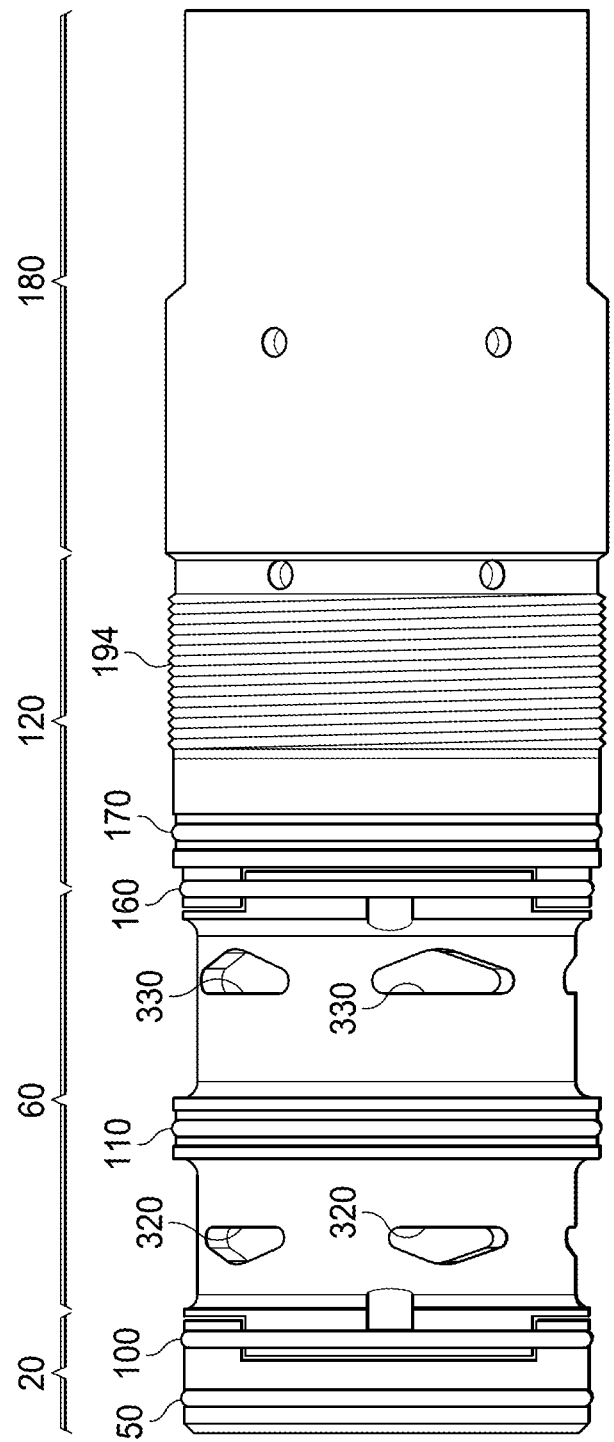
FIG. 2 is a side elevation view of the valve of FIG. 1.
Figure 3:
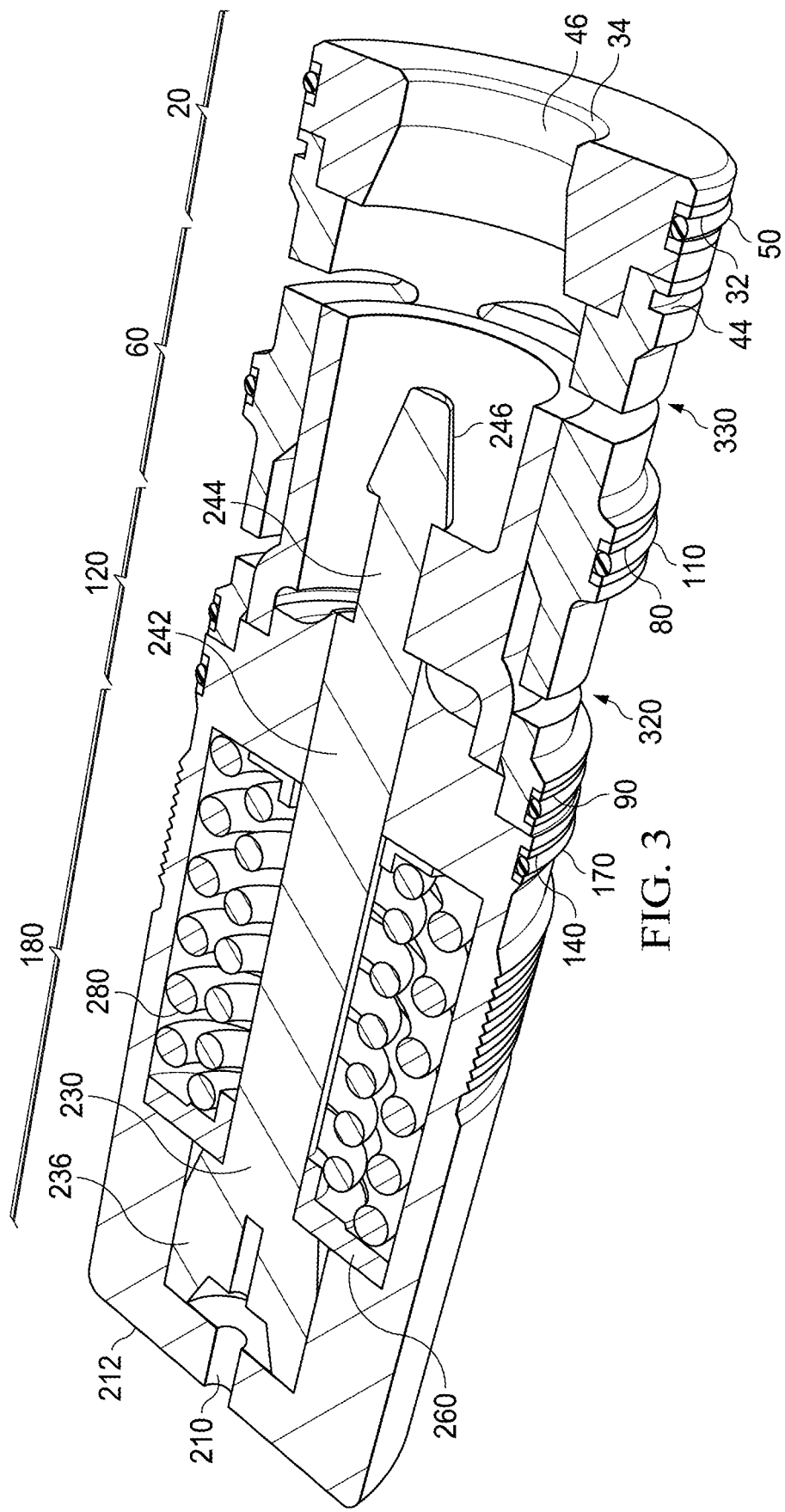
FIG. 3 is a simplified perspective cutaway view of the a valve of FIG. 1.
Figure 5A:
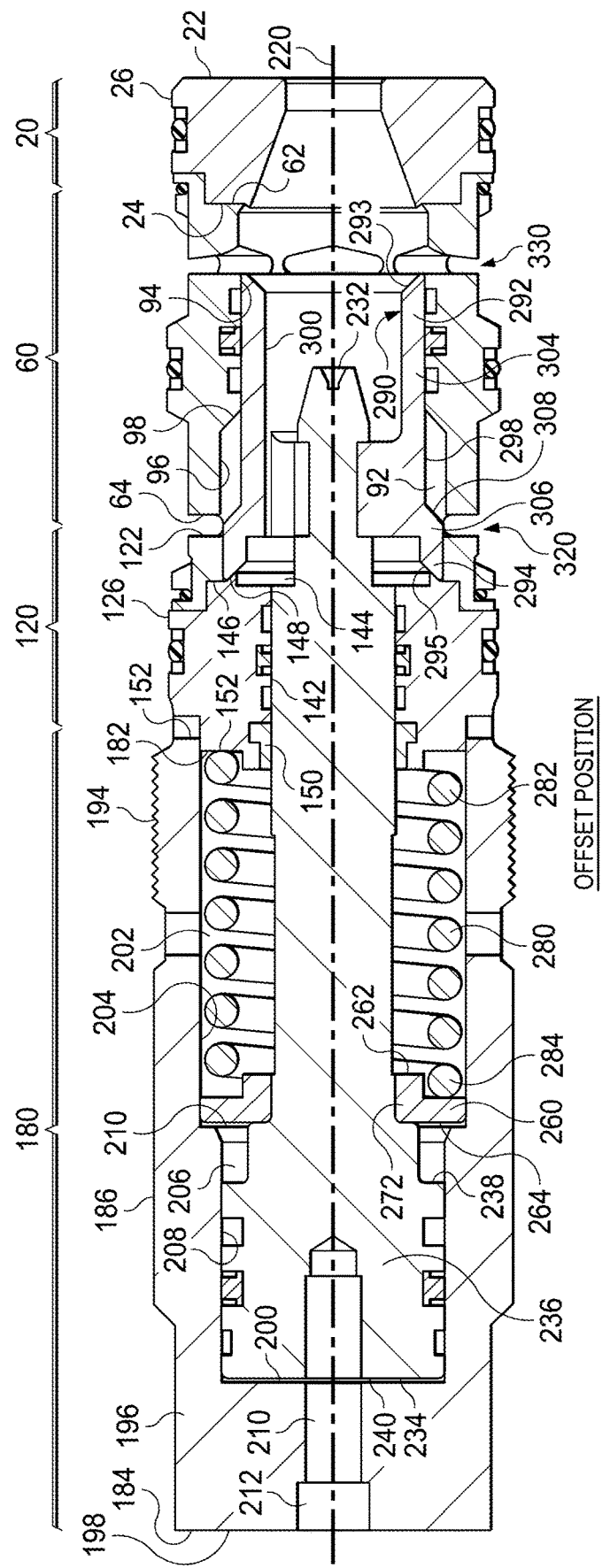
FIG. 5A is a side cutaway view of a valve of FIG. 1 shown in an offset position.
Figure 5B:
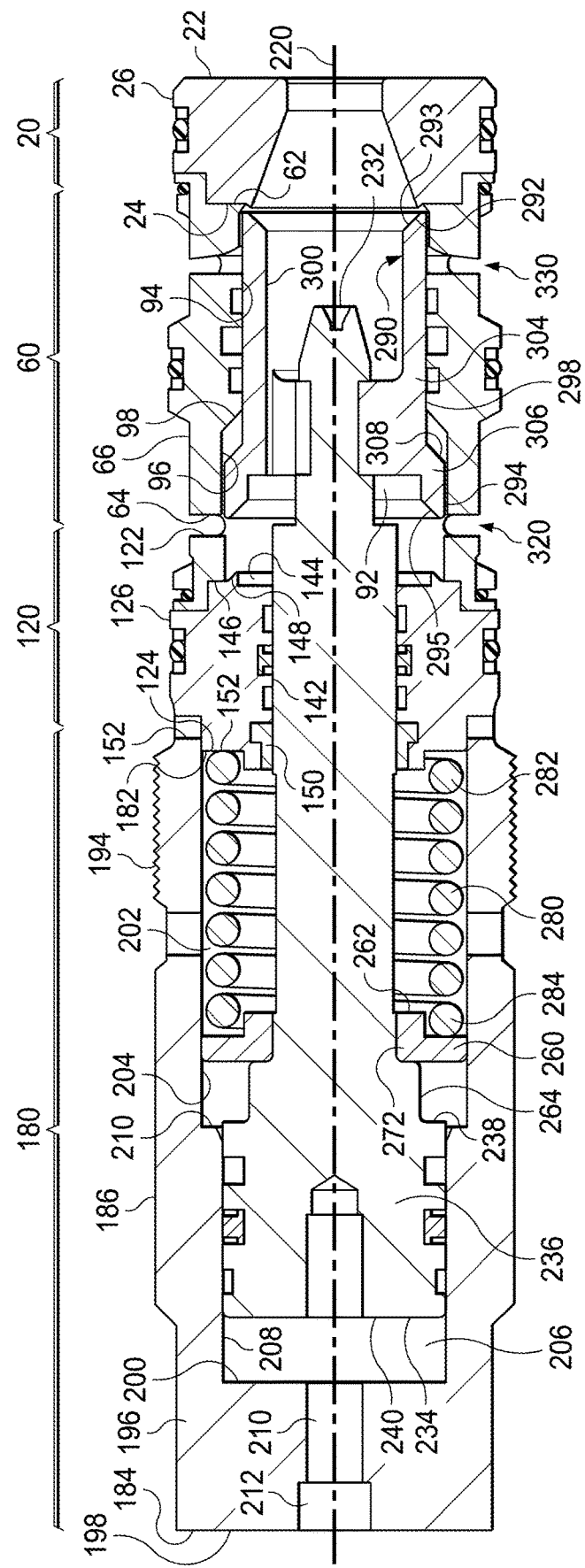
FIG. 5B is a side cutaway view of the valve of FIG. 1 shown in a piloted position.
Figure 6A:
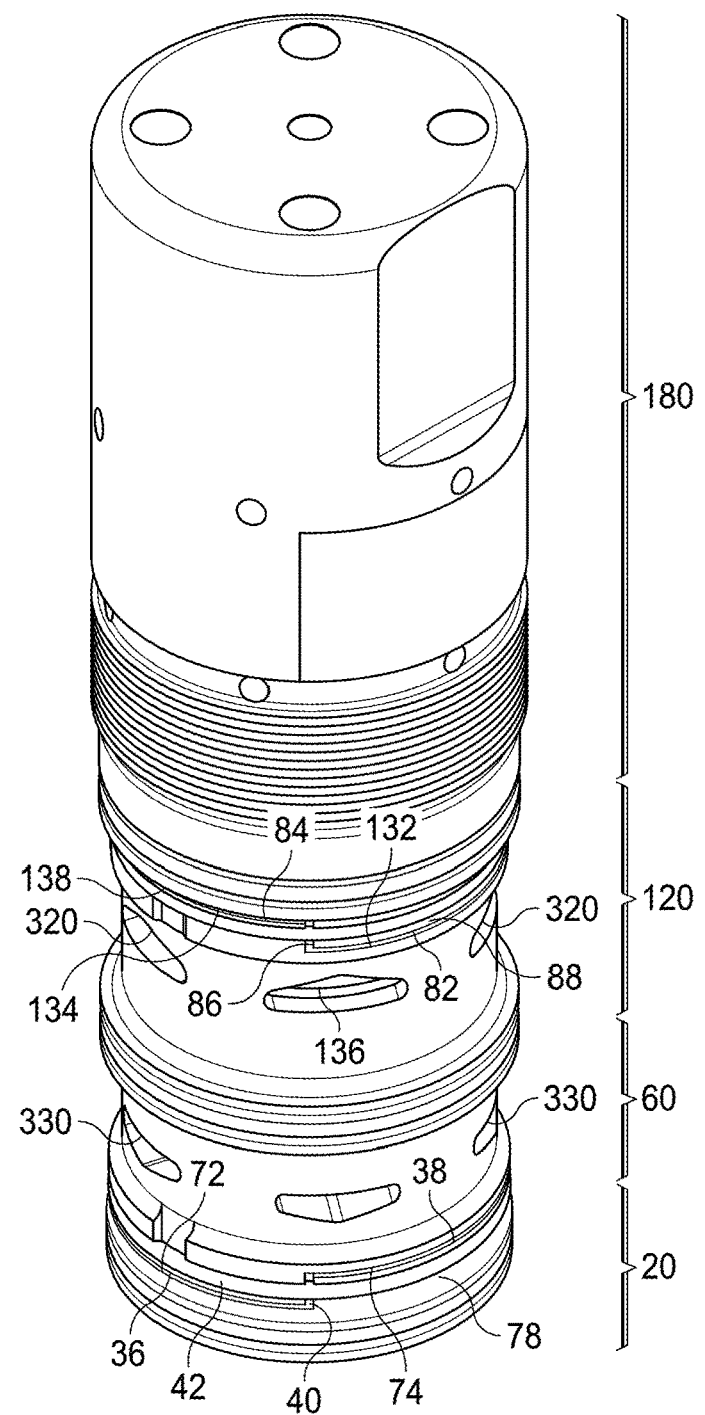
FIG. 6A is a top perspective view of the valve of FIG. 1.
Figure 6B:
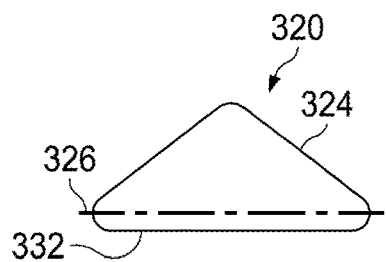
FIG. 6B is a schematic of a first port in the valve of FIG. 1.

FIG. 1 is a bottom perspective view of valve 10 according to aspects of the present disclosure. FIG. 2 is a side view; FIG. 3 is a simplified perspective cutaway view; of valve 10 according to aspects of the present disclosure; FIG. 5 is a side cutaway view; and FIG. 6 is a top perspective view of valve 10.

In various embodiments valve 10 is constructed according to the illustrated components. A lower seat 20 joins to a sleeve 60, which joins to upper seat 120. These components may be retained together by retainer springs 100, 160. At the junction between lower seat 20 and sleeve 60, and the junction between sleeve 60, and upper seat 120 may be a series of mated protrusions having interlocking recesses for retaining the respective retainer springs 100, 160 such that valve 100 may be inserted to or removed from a manifold or other circuit component in one piece.

A function port 34 may be defined at the lower valve seat 20 while a supply port 320 is defined in sleeve 60 proximate upper valve seat 120. A vent port 330 may be defined in sleeve 60 proximate lower valve seat 20.

An internal poppet 290 is retained on piston 230 for valving operations. A spring follower 260 interposes piston 230 and spring 280 biasing the valve 10 in the closed configuration. Cap 180 retains the piston 230, spring follower 260, and spring 280 in position above the upper valve seat 120. Various seals may be supplied where needed. Various grooves a recess may be cast or machined where needed to retain the seals. O-ring 50, 110, and 170, may also be provided in various defined cuttings or grooves and ensure proper sealing of the valve 10 into the circuit or manifold in which it is deployed.

Threads 194 may be provided on cap 180 for fixation of the valve 10 in a proper location. Cap 180 may define a pilot port 212. Installation holes may also be defined in cap 180 to aid in insertion and removal of valve 10.

Figure 4:
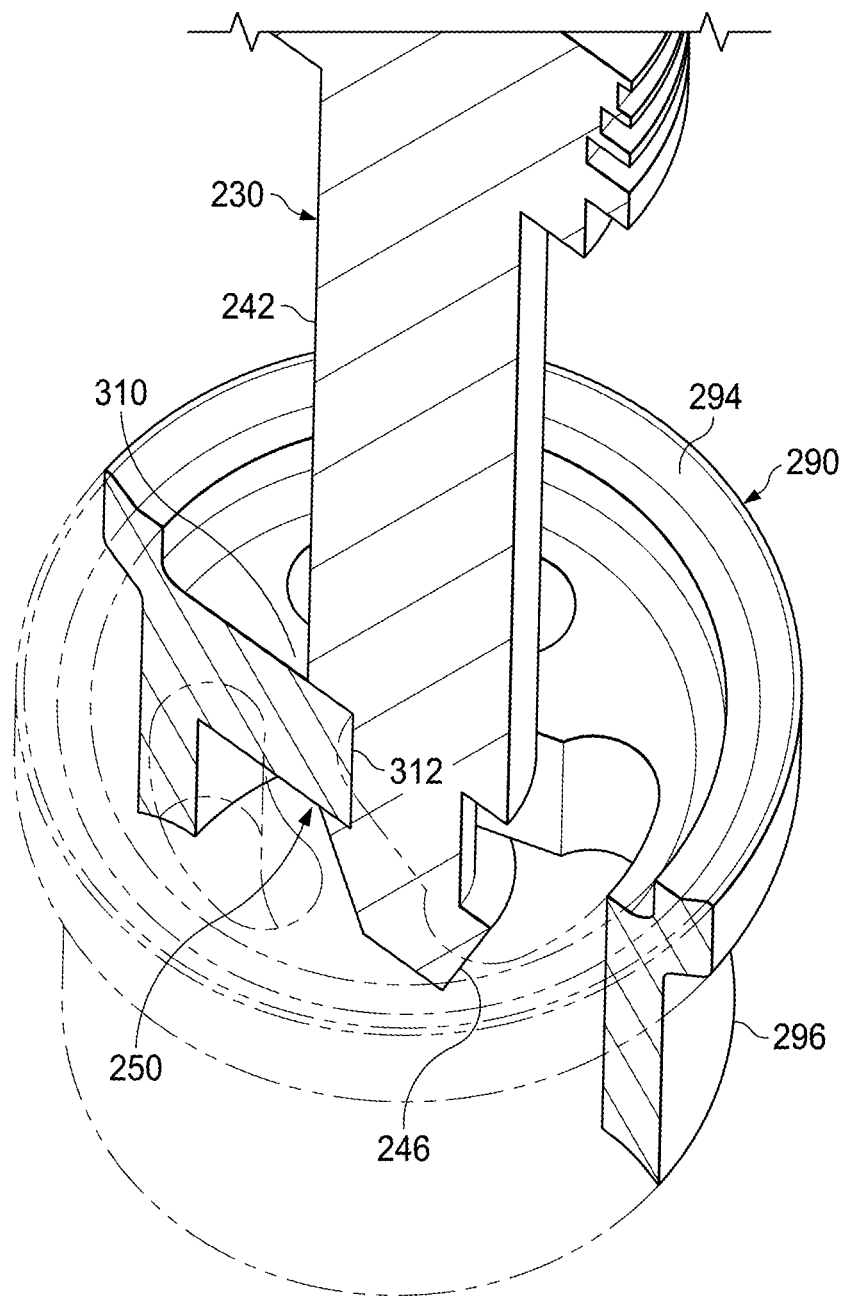
FIG. 4 is a perspective view of a fitting of a hydraulic piston rod fitted to a poppet for internal operation with the valve of FIG. 1.

Referring now to FIG. 4, a perspective view of a fitting of a hydraulic piston rod 242 to poppet 290 via keyhole 312 defined in poppet 290. The piston rod 242 is a subcomponent of piston 230. The keyhole 312 receives piston rod 242 in a secure fashion allowing the piston rod 242 to "push" or "pull" poppet 290 for operation of valve 10. The keyhole arrangement allows poppet 290 and piston 230 to be separated when valve 10 is disassembled but retains these components rigidly together when assembled into the valve 10.

Figure 7A:
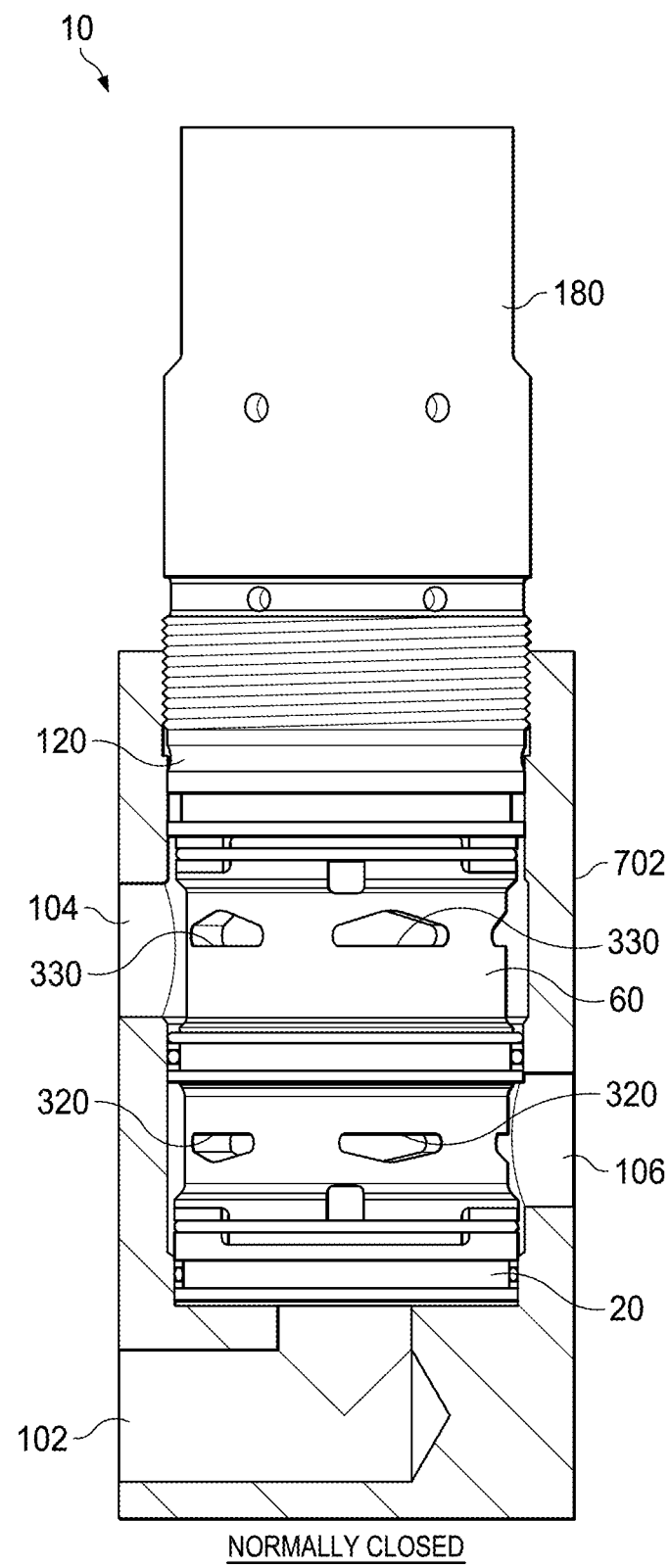
FIG. 7A is a side view of the valve of FIG. 1 shown in a normally closed position and installed into a manifold.
Figure 7B:
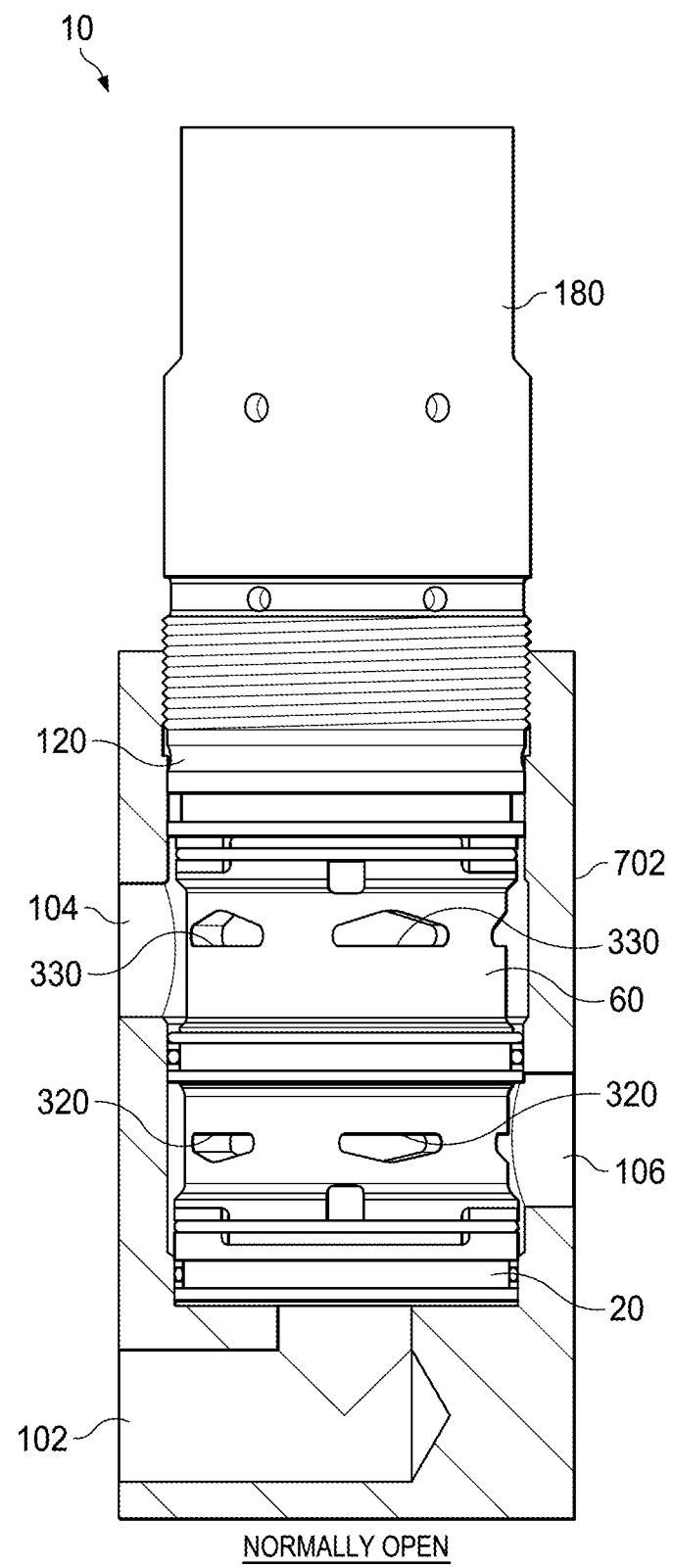
FIG. 7B is a side view of the valve of FIG. 1 shown in a normally open position and installed into a manifold.

Referring now to FIG. 7, a side view of the valve 10 into a manifold 702 is shown. Here it can be seen how fluid at the supply port 320 is normally prevented from flowing through the valve 10 to the function port 34 by spring 280 retaining piston 230 and poppet 290 in the upper position—poppet 290 being held against upper valve seat 120. Upon pressurization of the pilot port 212, piston 230 and poppet 290 are moved toward lower valve seat 20. When poppet 290 rests against valve seat 20, vent port 330 may be closed. Fluid flows into supply port 320 and out through function port 34.

The components of the valve 10 may comprises various steels and other resilient materials (seal and O-rings may comprise elastomers, rubbers, polymers, and the like). Size and flow rates of the valve 10 may vary according to application.

In greater detail, referring now to the figures, shown is multi-function valve 10. Multi-function valve 10 includes a lower seat 20 having a first end 22, a second end 24 (FIGS. 5A and 5B), and a side wall 26. Side wall 26 has an external surface and an internal surface. The external surface of sidewall 26 defines first external groove 32 proximate to first end 22. First end 22 defines function port 34. Second end 24 of lower seat 20 has first surface 36 and a second surface 38 (FIGS. 1, 2, 6). First surface 36 and second surface 38 are separated by lower seat steps 40. First surface 36 is a first distance from first end 22 and second surface 38 is a second distance away from first end 22. External surface 28 of side wall 26 of lower seat 20 defines a first portion 42 of second external groove 44. First portion 42 of second external groove 44 extends between each of lower seat steps 40. First portion 42 of second external groove 44 is adjacent to second surface 38 of second end 24 of lower seat 20. Internal surface 30 of side wall 26 defines function path passageway 46 that extends through lower seat 20 from function port 34 on first end 22 to second end 24 of lower seat 20. A lower sealing surface 48 is provided adjacent to function passageway 46 on second end 24 of lower seat 20. Lower sealing surface 48 preferably has an angled contact surface 49.

First seal 50 is received in first external groove 32. First seal 50 is preferably an O-ring.

Sleeve 60 has first end 62, second end 64, and side wall 66. Side wall 66 defines an external surface and an internal surface. First end 62 of sleeve 60 is adjacent second end 24 of lower seat 20. First end 62 of sleeve 60 has first surface 72 and second surface 74 separated by first end sleeve steps 76. First surface 72 of first end 62 of sleeve 60 is adjacent to first surface 36 of second end 24 of lower seat 20. Second surface 74 of first end 62 of sleeve 60 is adjacent to second surface 38 of second end 24 of lower seat 20. First end sleeve steps 76 are adjacent to lower seat steps 40. The external surface of side wall 66 of sleeve 60 defines second portion 78 of second external groove 44 between each of first end sleeve steps 76. Second portion 78 of second external groove 44 is adjacent to first surface 72 of first end 62 of sleeve 60. Sleeve 60 defines third external groove 80 between first end 62 and second end 64.

Second end 64 of sleeve 60 has first surface 82 and second surface 84. First surface 82 and second surface 84 of second end 64 of sleeve 60 are separated by second end sleeve steps 86. The external surface of side wall 66 of sleeve 60 defines first portion 88 of fourth external groove 90 between each of the second end sleeve steps 86. First portion 88 of fourth external groove 90 is adjacent to second surface 84 of second end 64 of sleeve 60. The internal surface of side wall 66 of sleeve 60 defines poppet chamber 92. The internal surface of side wall 66 has first smaller diameter section 94 extending from first end 62 and second larger diameter section 96 extending from second end 64. First smaller diameter section 94 and second larger diameter section 96 communicate via sloped transition section 98.

First retainer spring 100 is located in first portion 42 and second portion 78 of second external groove 44 for securing lower seat 20 and sleeve 60 together.

Second seal 110 is received in third external groove 80. Second seal 110 is preferably an O-ring.

Upper seat 120 has first end 122, second end 124, and side wall 126. Side wall 126 defines an external surface and an internal surface. First end 122 of upper seat 120 is adjacent to second end 64 of sleeve 60. First end 122 of upper seat 120 has first surface 132 and second surface 134 separated by first end upper seat steps 136. First surface 132 of first end 122 of upper seat 120 is adjacent to first surface 82 of second end 64 of sleeve 60. Second surface 134 of first end 122 of upper seat 120 is adjacent second surface 84 of second end 64 of sleeve 60. The external surface of side wall 126 adjacent to first surface 132 of upper seat 120 defines second portion 138 of fourth external groove 90 between each of first end upper seat steps 136. External surface 128 of side wall 126 of upper seat 120 defines fifth external groove 140 proximate second end 124 of upper seat 120.

The internal surface of upper seat 120 defines piston shaft passageway 142. Piston shaft passageway 142 extends from first end 122 to second end 124 of upper seat 120. First end 122 of upper seat 120 defines protruding central portion 144 and annular upper sealing surface 146 surrounding protruding central portion 144. Upper annular sealing surface 146 preferably has a sloped section 148 proximate piston shaft passageway 142. Second end 124 of upper seat 120 defines annular seal receptacle 150 adjacent piston shaft passageway 142. Annular spring receiver 152 surrounds annular seal receptacle 150.

A second retainer spring 160 is received in first portion 88 and second portion 138 of fourth external groove 90 for securing sleeve 60 and upper seat 120 together.

Third seal 170 is received in fifth external groove 140 of upper seat 120. Third seal 170 is preferably an O-ring.

Cap 180 has first end 182, second end 184, and side wall 186. Side wall 188 defines an external surface and an internal surface. Cap 180 is affixed to second end 124 of upper seat 120. External surface 190 of side wall 186 of cap 180 defines external threads 194. Cap 180 defines end wall 196 having external surface 198 and internal surface 200. Internal surface 192 of side wall 186 and internal surface 200 of end wall 196 define spring chamber 202. Spring chamber 202 has a first larger diameter section 204 extending from first end 182 of cap 180. Internal surface 192 of side wall 186 additionally defines piston chamber 206 having second smaller diameter section 208 extending from end wall 196. First larger diameter section 204 and second smaller diameter section 208 communicate via annular step 210. External surface 198 of end wall 196 defines pilot port 212. Pilot passageway 214 extends from pilot port 212 on second end 184 of cap 180 to internal surface 200 of end wall 196 for communicating second end 184 of cap 180 with piston chamber 206.

Multi-function valve 10 defines longitudinal axis 220.

Piston 230 has first end 232 and second end 234. Piston head 236 is adjacent second end 234 of piston 230. Piston head 236 has first end 238 and second end 240. Piston 230 has piston shaft 242 extending from piston head 236 to first end 232 of piston 230. Piston shaft 242 defines recessed area 244 adjacent first end 232. Piston shaft 242 defines tapered area 246 between recessed area 244 and first end 232. Tapered area 246 is preferably shaped to form a key 250 (FIG. 4). Piston head 236 is received in piston chamber 206. Piston shaft 242 extends from piston head 236 through piston shaft passageway 142 of upper seat 120 and into poppet chamber 92 of sleeve 60.

Annular spring follower 260 has first end 262 and second end 264, an inside surface, and an outside surface. The inside surface defines piston shaft orifice 272. Piston shaft orifice 272 receives piston shaft 242. Second end 264 is adjacent to annular step 210 of cap 180 and abuts first end 238 of piston head 236.

Internal spring 280 has first end 282 and second end 284. First end 282 is received in annular spring receiver 152 of second end 124 of upper seat 120. Second end 284 abuts first end 262 of annular spring follower 260.

Poppet 290 is received in poppet chamber 92 of sleeve 60. Poppet 290 has first end 292 and second end 294 and a side wall 296. Side wall 296 defines an outside surface 298 and an interior surface 300. First end 292 preferably has a first beveled end surface 293 for selective sealing communication with the angled contact surface 49 of the lower sealing surface 48 of the lower valve seat 20. Angled contact surface 49 defines an angle with respect to a longitudinal axis 220 of valve 10. The angle of the angled contact 49 surface differs from the angle of first beveled end surface 293 by an amount preferable between 0.5 and 5 degrees. Second end 294 of poppet 290 defines second beveled end surface 295. Second beveled surface 295 defines an angle with respect to longitudinal axis 220. Sloped section 148 of annular upper sealing surface 146 of upper seat 120 makes sealing contact with first end 292 of poppet 290. Sloped section 148 defines an angle with respect to a longitudinal axis 220 of valve 10. The angle of sloped section 148 differs from the angle of second beveled end surface 295 by an amount preferably between 0.5 and 5 degrees. Side wall 296 has a first smaller diameter section 304 extending from first end 292 and a second larger diameter section 306 extending from second end 294. First smaller diameter section 304 and second larger diameter section 306 communicate via transition section 308. Outside surface 298 of first smaller diameter section 304 is slidingly received within internal surface 70 of first smaller diameter section 94 of side wall 66 of sleeve 60. Outside surface 298 of side wall 296 of second larger diameter section 306 of poppet 290 is slidingly received within internal surface 70 of second larger diameter section 96 of side wall 66 of sleeve 60. Outside surface 298 of side wall 296 of poppet 290 at transition section 308 is for selectively engaging sloped transition section 98 of sleeve 60 for limiting travel of poppet 290 in a direction towards lower seat 20. Poppet 290 has a piston shaft connector 310 attached to interior surface 300 of side wall 296 of poppet 290. In one embodiment, piston rod connector 310 forms a key slot 312 having a complementary shape to key 250 of piston shaft 242. Piston shaft connector 310 is received in recessed area 244 of piston shaft 242 for ensuring that poppet 290 moves with piston 230.

A first set of ports 320 are defined by first smaller diameter section 94 of internal surface 70 of side wall 66 of sleeve 60. First set of ports 320 are located between first seal 50 and second seal 110. Each port of first set of ports 320 has first side 322, second side 324, and first port reference line 326 (see FIG. 6B). Second side 324 preferably has a non-linear shape wherein a first portion of second side 324 is a greater distance from first port reference line 326 than a second portion of first side 324.

Second set of ports 330 are defined by second larger diameter section 96 of internal surface 70 of side wall 66 of sleeve 60. Second set of ports 330 are located between second seal 110 and third seal 170. Each second port of second set of ports 330 has a first side 332, a second side

Figure 6C:
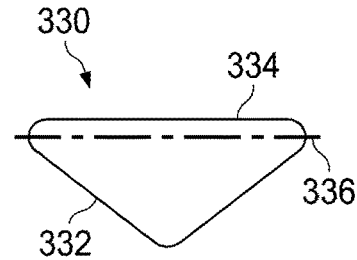
FIG. 6C is a schematic of a second port in the valve of FIG. 1.

334, and a second port reference line 336 (see FIG. 6C). First side 332 has a non-linear shape wherein a first portion of first side 332 is a greater distance from second port reference line 336 than a second portion of first side 332.

Although particular embodiments have been described herein, it will be appreciated that the invention is not limited thereto and that many modifications and additions thereto may be made within the scope of the invention. For example, various combinations of the features of the following dependent claims can be made with the features of the independent claims without departing from the scope of the present invention.

It is to be understood that the terms "including", "comprising", "consisting" and grammatical variants thereof do not preclude the addition of one or more components, features, steps, or integers or groups thereof and that the terms are to be construed as specifying components, features, steps or integers.

If the specification or claims refer to "an additional" element, that does not preclude there being more than one of the additional element.

It is to be understood that where the claims or specification refer to "a" or "an" element, such reference is not be construed that there is only one of that element.

It is to be understood that where the specification states that a component, feature, structure, or characteristic "may", "might", "can" or "could" be included, that particular component, feature, structure, or characteristic is not required to be included.

Methods of the present invention may be implemented by performing or completing manually, automatically, or a combination thereof, selected steps or tasks.

The term "method" may refer to manners, means, techniques and procedures for accomplishing a given task including, but not limited to, those manners, means, techniques and procedures either known to, or readily developed from known manners, means, techniques and procedures by practitioners of the art to which the invention belongs.

The term "at least" followed by a number is used herein to denote the start of a range beginning with that number (which may be a ranger having an upper limit or no upper limit, depending on the variable being defined). For example, "at least 1" means 1 or more than 1. The term "at most" followed by a number is used herein to denote the end of a range ending with that number (which may be a range having 1 or 0 as its lower limit, or a range having no lower limit, depending upon the variable being defined). For example, "at most 4" means 4 or less than 4, and "at most 40%" means 40% or less than 40%.

When, in this document, a range is given as "(a first number) to (a second number)" or "(a first number)-(a second number)", this means a range whose lower limit is the first number and whose upper limit is the second number. For example, 25 to 100 should be interpreted to mean a range whose lower limit is 25 and whose upper limit is 100. Additionally, it should be noted that where a range is given, every possible subrange or interval within that range is also specifically intended unless the context indicates to the contrary. For example, if the specification indicates a range of 25 to 100 such range is also intended to include subranges such as 26-100, 27-100, etc., 25-99, 25-98, etc., as well as any other possible combination of lower and upper values within the stated range, e.g., 33-47, 60-97, 41-45, 28-96, etc. Note that integer range values have been used in this paragraph for purposes of illustration only and decimal and fractional values (e.g., 46.7-91.3) should also be understood to be intended as possible subrange endpoints unless specifically excluded.

It should be noted that where reference is made herein to a method comprising two or more defined steps, the defined steps can be carried out in any order or simultaneously (except where context excludes that possibility), and the method can also include one or more other steps which are carried out before any of the defined steps, between two of the defined steps, or after all of the defined steps (except where context excludes that possibility).

Further, it should be noted that terms of approximation (e.g., "about", "substantially", "approximately", etc.) are to be interpreted according to their ordinary and customary meanings as used in the associated art unless indicated otherwise herein. Absent a specific definition within this disclosure, and absent ordinary and customary usage in the associated art, such terms should be interpreted to be plus or minus 10% of the base value.

Thus, the present invention is well adapted to carry out the objects and attain the ends and advantages mentioned above as well as those inherent therein. While the inventive device has been described and illustrated herein by reference to certain preferred embodiments in relation to the drawings attached thereto, various changes and further modifications, apart from those shown or suggested herein, may be made therein by those of ordinary skill in the art, without departing from the spirit of the inventive concept the scope of which is to be determined by the following claims.

What is claimed is:

1. A valve comprising:
    a lower valve seat defining a function port;
    an upper valve seat;
    a sleeve between said upper valve seat and said lower valve seat, said sleeve defining a sidewall that surrounds a poppet chamber, said sidewall defining a first port;
    a poppet received in said poppet chamber of said sleeve, said poppet having a sidewall, said poppet movable within said sleeve to selectively seal against said lower valve seat in a piloted position or to seal against said upper valve seat in an offset position, said sidewall of said poppet blocking said first port when said poppet is positioned in said offset position;
    a piston having a piston shaft, said piston shaft passing through said upper valve seat, said piston shaft affixed to said poppet for selectively moving said poppet into said piloted position and said offset position;
    a spring for biasing said piston so that said poppet defaults in said offset position against the upper valve seat for preventing fluid flow into the first port;
    a pilot port for supplying pressure for sliding said piston for compressing said spring and for moving said poppet away from said offset position to said piloted position so that fluid may flow into said first supply and out of said function port;
    wherein said upper valve seat defines a protruding central portion and a surrounding sloped section that defines a contact surface; and
    wherein said second end of said poppet defines a second beveled end surface for sealing contact with said contact surface of said upper valve seat.

2. The valve according to claim 1 wherein:
    said first port is a supply port.

3. The valve according to claim 1 wherein:
    said first port is a vent port.

4. The valve according to claim 1, wherein:
said sidewall of said sleeve further defines a second port proximate said lower valve seat and providing a fluid path from outside the valve to said function port when the poppet is in said offset position in contact with said upper valve seat.

5. The valve according to claim 1, wherein:
said second port is a vent port.

6. The valve according to claim 1, wherein:
said second port is a supply port.

7. The valve of claim 4, wherein:
said poppet blocks fluid flow to said second port when said poppet is in said piloted position in contact with said lower valve seat.

8. The valve according to claim 1 wherein:
said poppet defines a piston shaft connector for securing said poppet to said piston shaft, wherein said piston shaft connector defines a key slot;
wherein said piston shaft defines a key having a complementary shape to said key slot.

9. The valve according to claim 1 wherein:
said first port has a first side, a second side, and first port reference line, wherein said second side is non-linear wherein a first portion of said second side is a greater distance from said first port reference line than a second portion of first side;
wherein when said poppet is moved from said offset position to said piloted position, a sealing portion of said sidewall of said poppet first exposes a small portion of said first port along said second side and progressively more of said first port is exposed as more of said second side of said first port is passed by said sealing portion of said sidewall of said poppet.

10. The valve according to claim 1 wherein:
second port has a first side, a second side, and a second port reference line, said first side is non-linear wherein a first portion of first side is a greater distance from said second port reference line than a second portion of said first side;
wherein when said poppet is moved from said piloted position to said offset position, a sealing portion of said sidewall of said poppet first exposes a small portion of said second port along said first side and progressively more of said second port is exposed as more of said first side of said second port is passed by said sealing portion of said sidewall of said poppet.

11. The valve according to claim 1, wherein:
said poppet has a first side and second side, wherein said poppet has structure facing said first side and has structure facing said second side; and
said structure facing said first side has a greater surface area than said structure facing said second side, for enabling pressure assist through said first port when moving said poppet from said offset position to said piloted position.

12. The valve of claim 1 wherein:
said lower valve seat defines a lower sealing surface that defines an angled contact surface;
said first end of said poppet defines a beveled end surface for sealing contact with said angled contact surface of said lower valve.

13. The valve according to claim 12 wherein:
said angled contact surface forms a first angle with respect to a longitudinal axis of said valve;
said beveled end surface forms a second angle with respect to said longitudinal axis of said valve;
wherein said first angle and said second angle are different.

14. The valve according to claim 13 wherein:
said first angle and said second angle differ an amount between 1 to 5 degrees.

15. The valve according to claim 1 wherein:
said contact surface of said sloped section forms a first angle with respect to a longitudinal axis of said valve;
said second beveled end surface forms a second angle with respect to said longitudinal axis of said valve;
wherein said first angle and said second angle are different.

16. The valve according to claim 15 wherein:
said first angle and said second angle differ an amount between 0.5 to 5 degrees.

* * * * *